US007860805B2

(12) United States Patent  
Wood (10) Patent No.: US 7,860,805 B2  
(45) Date of Patent: Dec. 28, 2010

(54) COMPUTER-IMPLEMENTED PERSONAL INFORMATION MANAGER METHOD AND SYSTEM

(75) Inventor: Stephen E. Wood, Mount Clemens, MI (US)

(73) Assignee: Personal Estate Manager, Inc., Sterling Heights, MI (US)

( * ) Notice: Subject to any disclaimer, the term of this patent is extended or adjusted under 35 U.S.C. 154(b) by 780 days.

(21) Appl. No.: 11/203,695

(22) Filed: Aug. 15, 2005

(65) Prior Publication Data

US 2007/0038483 A1 Feb. 15, 2007

(51) Int. Cl.
G06Q 99/00 (2006.01)

(52) U.S. Cl. ...................................................... 705/325
(58) Field of Classification Search ..................... 705/1; 726/26

See application file for complete search history.

(56) References Cited

U.S. PATENT DOCUMENTS

| 5,241,466 | A | | 8/1993 | Perry et al. | |
|---|---|---|---|---|---|
| 5,651,117 | A | * | 7/1997 | Arbuckle | 705/4 |
| 6,246,991 | B1 | | 6/2001 | Abe et al. | |
| 6,845,448 | B1 | | 1/2005 | Chaganti et al. | |
| 7,014,101 | B1 | * | 3/2006 | Kennedy | 235/375 |
| 2001/0051906 | A1 | * | 12/2001 | Esposito | 705/35 |
| 2002/0019744 | A1 | | 2/2002 | Yamamoto | |
| 2002/0072925 | A1 | * | 6/2002 | Krim | 705/1 |
| 2002/0111946 | A1 | | 8/2002 | Fallon | |
| 2003/0018498 | A1 | | 1/2003 | Banks | |
| 2003/0050733 | A1 | | 3/2003 | Martinez et al. | |
| 2003/0065539 | A1 | | 4/2003 | Kay | |
| 2003/0093365 | A1 | * | 5/2003 | Halper et al. | 705/38 |
| 2003/0182290 | A1 | | 9/2003 | Parker | |
| 2005/0071687 | A1 | * | 3/2005 | Pathakis et al. | 713/202 |
| 2006/0168143 | A1 | * | 7/2006 | Moetteli | 709/219 |
| 2006/0184641 | A1 | | 8/2006 | Moetteli | |

OTHER PUBLICATIONS

"Your Life—On the Web", Computer Research & Technology eTopics (http://www.crt.net.au/etopics/mylifebits.htm).
"Your Total Life Planning Organizer", Deni Services (http://www.deni.net).
Letter from Julie Williams from Comptroller of the Currency Administrator of National Banks, dated Jul. 27, 2001, to Scott Anderson, RE: "Conditional Approval #479, Sep. 2001".

* cited by examiner

Primary Examiner—Traci L Casler
(74) Attorney, Agent, or Firm—Brooks Kushman P.C.

(57) ABSTRACT

A computer-implemented method for managing personal information. The method includes (a) electronically receiving personal information of a monitored individual and a unique identifier of the monitored individual; (b) electronically receiving mortality information based on a mortality database having one or more records; and (c) electronically searching the mortality database records for the unique identifier of the monitored individual to obtain a mortality search result.

20 Claims, 7 Drawing Sheets

*Bold = Required

Step 1: Tell us about yourself

- **\*Full Name:** ⬜ — 66
- **\*Last Name:** ⬜ — 68
- **\*Email:** ⬜ — 70
  This will be used as your username
- **\*Choose a Password:** ⬜ — 72
  Note: Your password must contain at least one letter, at least one number, and be between 6 and 13 characters in length. A secure password protects you and your information.
- **\*Confirm your password:** ⬜ — 74
- **\*Address:** ⬜ — 76
- **\*City:** ⬜ — 78
- **\*State:** [Select a state ▽] — 86
- **\*Zipcode:** ⬜ — 80
- **\*Home Phone:** ⬜ — 82
- Secondary Phone: ⬜ — 84

Accept Terms of Service

☐ I've read and agree to the <u>My Peace of Mind Terms of Service</u> — 90

88

[ GO TO NEXT STEP » ]

*Bold = Required

2: Names of the people you want to have access to your information:

94

96 {
- *Person's Name: — 102
- *Relationship: — 103
- *Address: — 104
- *Email of Recipient: — 105
- *Address: — 106
- *City: — 108
- *State: Select a state ▽ — 112
- *Zipcode: — 110

98 {
- *Person's Name: — 102
- *Relationship: — 103
- *Address: — 104
- *Email of Recipient: — 105
- *Address: — 106
- *City: — 108
- *State: Select a state ▽ — 112
- *Zipcode: — 110

100 {
- *Person's Name: — 102
- *Relationship: — 103
- *Address: — 104
- *Email of Recipient: — 105
- *Address: — 106
- *City: — 108
- *State: Select a state ▽ — 112
- *Zipcode: — 110

GO TO NEXT STEP » — 114

Fig. 5

Please check all that apply

- 122 — ☐ I have one or more financial & legal advisors
- 124 — ☐ I have bank accounts
- 126 — ☐ I have bonds
- 128 — ☐ I have one or more stockbrokers & brokerage firms
- 130 — ☐ I have Certificates of Deposit (CDs)
- 132 — ☐ I have credit cards
- 134 — ☐ I have important documents
- 136 — ☐ I have financial instruments/investments
- 138 — ☐ I have one or more life insurance policies
- 140 — ☐ I have fixed montly payments
- 142 — ☐ I have mutual funds
- 144 — ☐ I have pension funds
- 146 — ☐ I have real estate
- 148 — ☐ I have one or more safety deposit boxes
- 150 — ☐ I have securities
- 152 — ☐ I have stocks

*Fig. 6*

Please check all that apply

- 122 — ☑ I have one or more financial & legal advisors    [ADD INFO »] 154
- 124 — ☑ I have bank accounts    [ADD INFO »] 156
- 126 — ☐ I have bonds
- 128 — ☑ I have one or more stockbrokers & brokerage firms    [ADD INFO »] 158
- 130 — ☐ I have Certivicates of Deposit (CDs)

Add a bank:

- *Bank Name: [______] ~162
- *Type of account: [______] ~164
  (checking, savings, etc.)
- *Services Held: (check all that apply)
  - ☐ 401(k)
  - ☐ Annunities
  - ☐ Bonds
  - ☐ CDs
  - ☐ Checking Account
  - ☐ IRAs
  - ☐ Life Insurance
  - ☐ Money Market
  - ☐ Mortgage
  - ☐ Mutual Funds
  - ☐ Pension Funds
  - ☐ Profit Sharing
  - ☐ Savings Account
  - ☐ Stocks
  - ☐ Trust
  - ☐ Will Estate Plan
  - ☐ Other: [______] ~168
- *Bank Address: [______] ~170
- *City: [______] ~172
- *State: [Select a state ▽] ~180
- *Zip Code: [______] ~174
- *Contact at the bank: [______] ~176
- *Contact Phone Number: [______] ~178

182 — [ |+| ADD ANOTHER BANK ]

184 — [ SAVE THIS INFO » ]

Please check all that apply

☑ I have one or more financial & legal advisors       *188*   [ ADD INFO » ]

| Here's the information you provided: |
|---|

Name: John Doe
Type: CPA
Company: Lorem ipsum, LLC
E-mail Address: lorem@ipsum.com
Phone Number: (555) 555-5555
Address: 1234 Street
City: East lansing
State: Michigan
Zip Code: 48825
Services/Information: Stocks, bonds
Edit this information —*190*

Name: Jack Smith
Type: Lawyer
Company: Smith,Jones,Harry, Connors & Alfredson Stuff, LLC
E-mail Address: ipsumlorem@verylongURLcompany.com
Phone Number: (555) 555-5555
Address: 1234 Street
City: East Lansing
State: Michigan
Zip Code: 48825
Services/Information: 401(k), Trust, Will, Estate Plan
Edit this information —*192*

COMPUTER-IMPLEMENTED PERSONAL INFORMATION MANAGER METHOD AND SYSTEM

BACKGROUND OF THE INVENTION

1. Field of the Invention

One aspect of the present invention relates to a computer-implemented personal information manager method and system.

2. Background Art

Mismanagement of personal estates may result in the loss of assets to individuals and their beneficiaries. The term beneficiaries can refer to, but is not limited to, beneficiaries, devisees, joint tenants and/or heirs. Currently, many banks, financial institutions, and insurance companies retain hundreds of billions of dollars in unclaimed assets. According to recent estimates, the proceeds of one in four life insurance policies remain unclaimed, and about sixteen (16) billion dollars of matured United States savings bonds remain unclaimed. These and other investments often remain unclaimed because the beneficiaries of a deceased benefactor are unaware of the death and/or of the existence of the investment.

Systems, in some instances, computer-implemented systems, exist for tracking the mortality of individuals and notifying beneficiaries of the death of the benefactor. In certain regards, mortality tracking involves determining mortality information, i.e. whether an individual is alive or deceased. However, these systems can be error prone since the data used for tracking is often unreliable. Moreover, these systems often passively track the mortality of individuals. Consequently, the mortality information is gathered in an untimely and inefficient manner.

Further, the problems of managing an estate are often complicated by the current trend of retired individuals to live part of the year in one state and part of the year in another state. This often means that the individual may have two sets of accounts, one in each state, two sets of advisers, etc. This scenario makes it harder to monitor the death of an individual. For instance, an attorney in Michigan may check the legal notices in Michigan to determine if a client for whom she is holding a will has died. If the client dies while wintering in Florida, the notice may be published in Florida, but not Michigan, making it very difficult for the attorney to hear of the death of the individual. Also, when close relatives of the deceased are based in one state and the deceased lives, at least part of the time, in another state, it makes it less likely the close relatives have independent knowledge about the advisers the deceased person had in the other state and assets located in the other state.

Thus, there exists a need to check a central database, e.g. the U.S. Social Security Administration mortality death index, for mortality tracking purposes. Also, there is a need to have information accessible on a website because a website can be accessed anywhere and the information can be obtained wherever it is needed.

Moreover, what is needed is a computer-implemented method and system having tracking and/or notification functionality for efficiently and timely informing an access individual of the personal information of a monitored individual. There also is a need to provide an automated system for determining the mortality information of the monitored individual and notifying the access individual, in case of death of the monitored individual.

SUMMARY OF THE INVENTION

One aspect of the present invention relates to a computer-implemented method and system having tracking and/or notification functionality for efficiently and timely informing an access individual of the personal information of a monitored individual. Another advantage of certain aspects of the present invention is an automated system for determining the mortality information of a monitored individual and notifying an access individual in case of a death of the monitored individual.

According to a first embodiment of the present invention, a computer-implemented method for managing personal information is disclosed. The method includes electronically receiving personal information of a monitored individual and a unique identifier of the monitored individual; electronically receiving mortality information based on a mortality database having one or more records; and electronically searching the mortality database records for the unique identifier of the monitored individual to obtain a mortality search result. Each mortality database record can include the unique identifier of a deceased individual. Alternatively, each mortality database record can include the unique identifier of an individual and a designator signifying whether the individual is deceased or living. In certain embodiments, the mortality search result is a positive result if the monitored individual is deceased and a negative result if the monitored individual is living.

The computer-implemented method can further include automatically repeating the searching step until a positive result is obtained. Moreover, the computer-implemented method can further include automatically and electronically transmitting a notification after the positive result is obtained. The notification can be an e-mail and can include personal information of the monitored individual. The transmitting step can include transmitting the notification to at least one access individual. The computer-implemented method can further include electronically receiving contact information relating to the at least one access individual. The monitored individual can select the at least one access individual. The monitored individual can be a benefactor and the at least one access individual can be a beneficiary. The mortality database can be a governmental mortality database or a database derived from a governmental database. The computer-implemented method can further include electronically transmitting the unique identifier to a tracking computer having access to the mortality database.

The computer-implemented method can further include initiating the mortality searching based on a triggering event. Non-limiting examples of triggering events include inactivity of an account held by the monitored individual; or a lack of response from an e-mail reminder to the monitored individual.

Non-limiting examples of unique identifiers include driver's license number coupled with an identifier for the issuing state, national identity number, social security number, dental identifier, fingerprint identifier, retinal identifier, and DNA profile.

According to a second embodiment of the present invention, a computer system for managing personal information is disclosed. The system can include one or more computers. The one or more computers can be configured to receive personal information of a monitored individual and a unique identifier of the monitored individual; receive mortality information based on a mortality database having one or more data records; and search the mortality database records for the unique identifier of the monitored individual to obtain a mortality search result. Each mortality database record can include the unique identifier of a deceased individual. Alternatively, each mortality database record can include the unique identifier of an individual and a designator signifying whether the individual is deceased or living. In certain embodiments, the mortality search result is a positive result if the monitored individual is deceased and a negative result if the monitored individual is living.

The one or more computers can be interconnected by a computer network. Alternatively, the one or more computers are not interconnected by a computer network.

In certain embodiments, the computer can be further configured to automatically repeat the searching step until a positive result is obtained. Moreover, the computer can be further configured to automatically and electronically transmit a notification after the positive result is obtained and transmit the notification to at least one access individual. The computer can also be configured to electronically receive contact information relating to the at least one access individual, wherein the monitored individual selects the at least one access individual.

According to a third embodiment of the present invention, a computer system for securely managing personal information is disclosed. The computer system includes a user computer configured to receive personal information of a monitored individual and to transmit the personal information; and a dedicated computer for receiving and storing the personal information transmitted by the user computer. The dedicated computer can include an output device for storing the personal information to an offline storage device. The computer system can further include a stand-alone computer for receiving the personal information from the offline storage device. The stand-alone computer can be a mortality tracking computer.

In certain embodiments, the dedicated computer does not store one or more identity theft indicators related to the monitored individual. The one or more identity theft indicators can include social security number, driver's license number, account number, monitored individual's name, monitored individual's address, or monitored individual's phone number. The user computer can be further configured to display the personal information. The user computer can be further configured to not display identity theft indicators. The offline storage device can be a compact disc, an external hard drive, or a stand-alone computer. In certain embodiments, the user computer and/or dedicated computer is capable of receiving and transmitting 128-bit encrypted information.

According to yet another embodiment, a set of instructions written to a computer readable medium for managing personal information is disclosed. The instructions include steps to: electronically receive personal information of a monitored individual and a unique identifier of the monitored individual; electronically receive mortality information based on a mortality database having one or more records; and electronically receive a mortality search result based on a search of the mortality database records for the unique identifier of the monitored individual.

According to another embodiment, a computer system for managing personal information is disclosed. The computer system includes a personal information manager module for receiving personal information of a monitored individual and a unique identifier of the monitored individual; and a mortality tracking module for receiving the mortality search result of the monitored individual based on the unique identifier and a mortality database, and, in response to a positive search result, for transmitting a notification to at least one access individual identified by the monitored individual to receive such notification. The computer system can further include a maturity notification module for notifying the monitored individual of at least one important date.

These and other objects of the present invention will become more apparent from a reading of the specification in conjunction with the drawings.

DETAILED DESCRIPTION OF EMBODIMENTS OF THE PRESENT INVENTION

Reference will now be made in detail to embodiments, methods and systems of the present invention known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

Except where expressly indicated, all elements in this description are to be understood as modified by the word "one or more" in describing the broadest scope of the present invention. The first definition of an acronym or other abbreviation applies to all subsequent uses herein. Further, except where expressly indicated or inapplicable, all numerical quantities are to be understood as modified by the word "about" in describing the broadest scope of the present invention. Practice within the numerical limits stated may be preferred.

According to certain aspects of the present invention, a computer-implemented system is provided so that an individual can collect, organize, secure, track and/or manage their personal information. In certain embodiments, the individual can be a monitored individual. In certain embodiments, a system is disclosed to monitor the mortality of monitored individual. Personal information can refer to any information the monitored individual can use in their lives. Non-limiting examples of personal information include financial, estate and investment information. Moreover, the personal information can relate to another individual, for example, an infant, child or elderly parent of the individual.

In certain embodiments, other individuals can input information relating to the monitored individual. A child can input information about a parent, who is disabled in some way. In this example, the child is acting as the agent of the parent. As another example, the monitored individual may be disabled in a way that makes typing difficult, e.g. an elderly person who cannot type easily due to arthritis or impairment from a stroke. In these cases, the monitored individual may designate someone to help him or her input the personal information. In another embodiment, an agent can receive the personal information of the monitored individual by phone, fax, mail, e-mail and enter that information using computers under control of an entity. This agent could be an employee, independent contractor or owner of the entity.

The system of certain embodiments of the present invention can be utilized to secure personal information of the monitored individual in a central location. The system can also include functionality to notify another individual of the personal information of the monitored individual. In certain embodiments, this individual is an access individual. The access individual can be any individual selected by the monitored individual to receive personal information upon the occurrence of a certain event. Non-limiting examples of access individuals include beneficiaries, devisees, heirs, assigns, joint tenants, relatives, close friends of the monitored individual and advisors of the monitored individual. In certain embodiments, the access individual can be a beneficiary of the monitored individual who is acting in the capacity of a benefactor.

The system can be partially or completely computer-implemented, and can be online, offline, or a blend thereof. The system can be embodied in stand-alone computer software or a number of graphical user interfaces (GUIs). The system can include the participation of individuals, for example, a personal estate manager, for supporting and maintaining different aspects of the system. According to one aspect of the present invention, the monitored individual can identify one or more access individuals, sometimes referred to as access people, to receive at least some, if not all of, the monitored individual's personal information upon the occurrence of an event, for example, death or incapacity of the monitored individual. The system can also notify the monitored individuals of important dates, for example, maturity dates, of assets and other personal items. The system also has the capability of mortality tracking, and in certain embodiments, automatic and/or continuous mortality tracking, of the monitored individuals so that the access individuals can be notified of death in a timely manner. It should be understood that mortality tracking can also be conducted on an intermittent basis, for example, checking a mortality database regularly with short intervals between succession tracking.

Figure 1A:
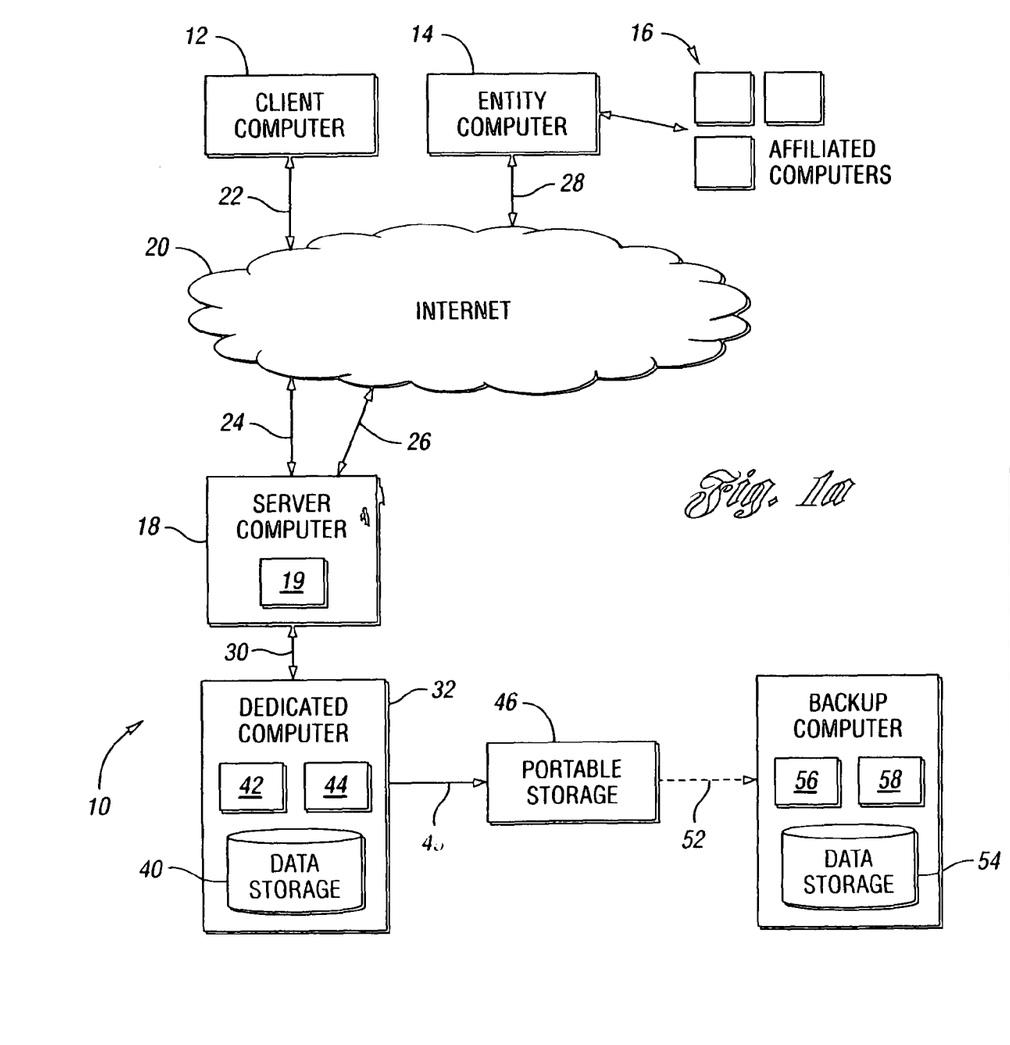
FIGS. 1a and 1b depict a computer system according to one embodiment of the present invention for managing personal information.

FIG. 1a depicts computer system 10 according to one embodiment of the present invention for managing personal information. System 10 can be referred to as a personal estate manager system. Client computer 12 can be a personal computer, for example, a desktop or notebook computer. Client computer 12 can be stand-alone or part of a computer network, depending on the implementation of the present invention. Client computer 12 and server computer 18 can be connected to a computer network, for example a local area network (LAN) or a wide area network (WAN), through a variety of interfaces, including, but not limited to dial-in connections, cable modems, high-speed lines, and hybrids thereof. According to FIG. 1a, client computer 12 can be connected to server computer 18 through communication lines 22 and 24 and Internet 20.

Server computer 18 can be a database server, an application server, a web server, a directory server, a mail server, and/or hybrids thereof. It will be apparent that the type of server computer 18 depends on the nature and implementation of computer system 10.

According to the embodiment depicted in FIG. 1a, client computer 12 and server computer 18 support TCP/IP protocol which has input and access capabilities via two-way communication lines 22 and 24. Another non-limiting example of supportable protocol is voice over Internet protocol, otherwise referred to as VOIP. Communication line 22 is an intranet-adaptable communication line, for example, a dedicated line, a satellite link, an Ethernet link, a public telephone network, a private telephone network, and hybrids thereof. Communication line 24 is adaptable to connect to the Internet 20. Examples of suitable communication lines include, but are not limited to, public telephone networks, public cable networks, and hybrids thereof. It is understood that communication lines 22 and 24 can be purely Internet-adaptable or intranet-adaptable or hybrids thereof. For example, communication line 22 can include an Internet-adaptable portion and an intranet-adaptable portion. In certain embodiments, firewalls (not shown) can be situated between client computer 12 and Internet 20 and server computer 18 and Internet 20 for security purposes.

Entity computer 14 can be a computer interconnected to a number of affiliated computers 16. Entity computer 14 can be designed to be used by an entity. In certain circumstances, the entity is a financial services entity. Entity computer 14 can be used by an estate planning attorney. Entity computer 14 can be configured to display one or more GUIs and/or install and execute software for implementing embodiments of the present invention. In one embodiment, a monitored individual, using affiliated computer 16, can access entity computer 14 and input personal information through entity computer 14. In this embodiment, from the point of view of the monitored individual, entity computer 14 functions as a server computer. If an entity installs a software package enabling it to have a stand-alone system, then entity computer 14 may not operate as a server computer. In certain embodiments, entity computer 14 is accessible only by the clients of the entity and those working for the entity (e.g. an owner, an employee, an independent contractor hired by the entity). Access to entity computer 14 can be controlled by the entity. In other embodiments, an agent of the entity (i.e., an owner, employee or independent contractor) can input the personal information of the monitored individual using affiliated computer 16. The information can be received by the agent of the entity either electronically, by mail, by phone, by fax, by personal interview, etc. In certain embodiments, an individual can enter information about himself or herself or about another individual such as a parent, dependent child, etc. This method may contemplate using a home or personal computer as opposed to an entity computer. A software product enables an individual to use a stand-alone system without a server computer hosting one or more GUIs for display on computers 12, 14 and/or 16.

Entity computer 14 and server computer 18 can support TCP/IP protocol which has input and access capabilities via two-way communication lines 26 and 28. Communication line 28 is an intranet-adaptable communication line, for example, a dedicated line, a satellite link, an Ethernet link, a public telephone network, a private telephone network, and hybrids thereof. Communication line 26 is adaptable to connect to the Internet 20. According to certain embodiments of the present invention, entity computer 14 can function as server 18.

Server computer 18 can serve a number of GUIs, through personal estate module 19 which can be accessed and displayed by client computer 12, entity computer 14, and/or affiliated computers 16. The GUIs can be used by the users to input personal estate information. This data is transmitted by computers 12, 14 and 16 to server computer 18 and received by server computer 18. In certain embodiments, the data transmitted through communication lines 22, 24, 26 and 28 is encrypted, for example, 128-bit encryption, to enhance the security of the system.

The received data can be transmitted through communication line 30 to dedicated computer 32. In certain embodiments, communication line 30 is a dedicated private line. Dedicated computer 32 includes data storage device 40, storage module 42 for storing data, and retrieval module 44 for retrieving stored data. Data storage device 40 can be a computer database. In certain embodiments, identity theft indicators are not stored in data storage device 40. As such, these indicators are not accessible through the Internet since the indicators are not stored in a database connected to the Internet. Other personal estate information can be stored to data storage device 40. This information is not useful to computer hackers because the identity theft indicators are not tied to the rest of the personal estate information. Non-limiting examples of identity theft indicators include social security numbers, driver's license numbers, account numbers, user name, user address, and user phone numbers.

The identify theft indicators, along with the rest of the personal information of the monitored individual, are transmitted and stored to portable storage device 46, through communication line 48. Non-limiting examples of portable storage device 46 include external hard drives, compact discs, flash memory storage devices, and internal hard drives of a stand-alone computer.

The personal information stored in portable storage device 46 can be transmitted to backup computer 50. In certain embodiments, this transfer is conducted offline for security purposes, as signified by dotted commutation line 52. Backup computer 50 includes data storage device 54, storage module 56 for storing data, and retrieval module 58 for retrieving stored data. Data storage device 54 can be a computer database.

Figure 1B:
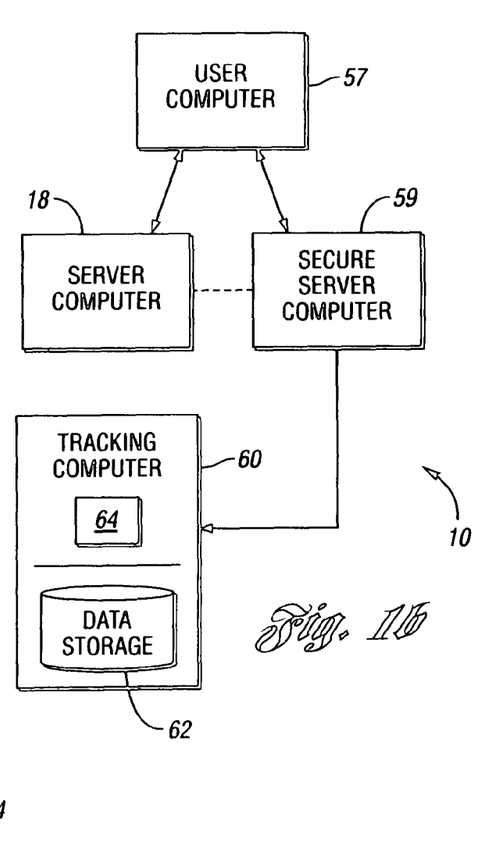

In certain embodiments of the present invention, system 10 includes functionality to execute mortality tracking, as depicted in FIG. 1*b*. User computer 57 can receive an e-mail address of a user who inputs the information into a GUI hosted by server computer 18. In certain embodiments, user computer 57 can be computers 12, 14 and/or 16. Once this information is received by server computer 18, control of the mortality tracking system can be transferred to secure server computer 59. Computer 59 can check to make sure that the user's e-mail address matches the one on a pre-existing user account. Computer 59 can host a GUI to prompt the user to enter a unique identifier, for example, a social security number. The user's social security number is only accessible on secure server computer 59 and is indexed by the user's e-mail address on server computer 18. If a hacker obtains access to server computer 18, the hacker can only see the e-mail address and does not have the indicators needed to steal a user's identity.

The unique identifier can be downloaded to tracking computer 60. Tracking computer 60 can be a computer that conducts mortality tracking and reports the results to another computer or to an entity. The e-mail address can operate as a user's account number. Tracking computer 60 can be offline for security purposes. Tracking computer 60 can include mortality database 62 or access a mortality database. It should be understood that mortality database can refer to any database which pertains to either (1) deceased individuals or (2) both living and deceased individuals and/or contains a designator which specifies whether an individual is alive or deceased. Mortality database 62 can be the United States Social Security Administration (U.S.S.S.A.) death index master file (otherwise referred to as the D.M.F.). Another example of a mortality database is a U.S. state online database of death certificates. The database may contain a number of data records, each typically having a social security number field of a deceased individual. Another example of a mortality database is a database generated by a private entity that extracts information from the U.S.S.S.A. D.M.F. to generate their own database, for example, the Loislaw subscriber database.

Tracking computer 60 can also include searching and matching module 64 for searching mortality data records and matching those records with the unique identifier information. It should be understood that the searching and matching can be done manually. The searching and matching module can output an indicator for indicating whether the result of the search was returned positive (i.e. a match was found) or negative (i.e. no match). In other words, a positive result means that the mortality database indicated the individual is deceased and a negative match indicates that the individual is alive. This indicator can be transmitted by tracking computer 60, through Internet 20 to server computer 18. Server computer 18 or tracking computer 60 can have functionality for notifying the access individual of the search results.

The system configuration depicted in FIG. 1*a* is but one example of many embodiments of the present invention. As another example, entity computer 14 can function as a server computer for serving affiliated computers 16 with a number of GUIs to implement certain features of the present invention. Moreover, entity computer 14 and/or affiliated computer 16 and/or client computer 12 can be outfitted with computer software embodying aspects of the present invention. In the latter example, a computer network may or may not be needed.

Figure 2:
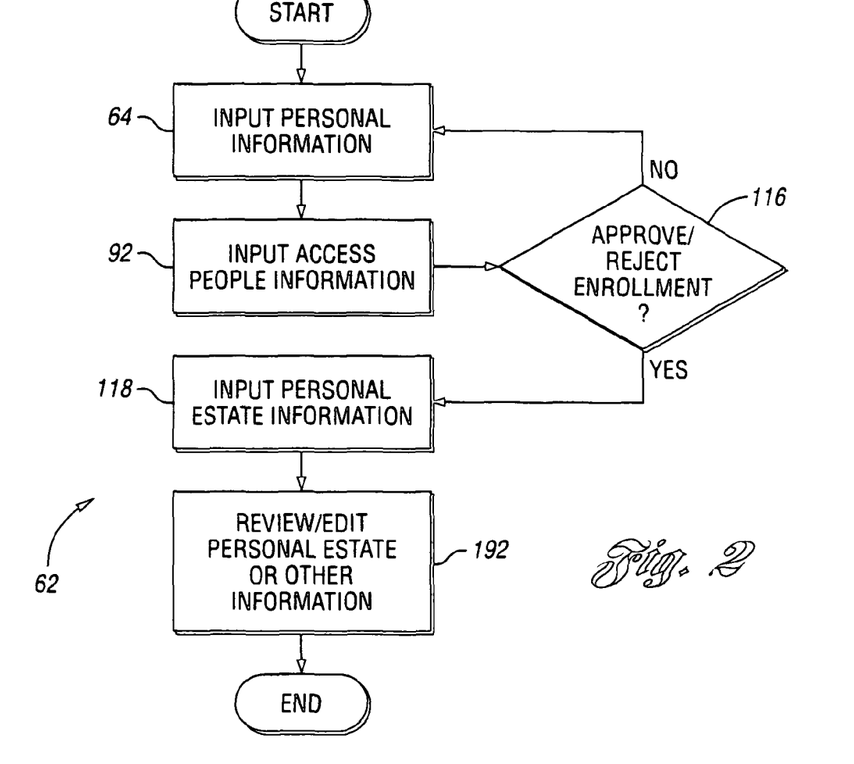
FIG. 2 is a flowchart of a method for enrolling in a personal management system and inputting personal information according to one embodiment of the present invention.

FIG. 2 is flowchart 62 of a method according to one embodiment of the present invention that can be implemented using computer system 10. It should be understood that elements of flowchart 62 can be modified, rearranged, and/or omitted according to different implementations of the present invention.

According to block 64, a user inputs personal information. The user can utilize client computer 12 and/or affiliated computer 16, which can display a GUI, for inputting personal information. In other embodiments, entity computer 14 can be used to input personal information. Alternatively, a software package can be installed on computer 12, 14 and/or 16 to facilitate input of personal information. In certain embodiments, an individual can enter information about himself or herself or about another individual such as a parent, dependent child, etc. This method may contemplate using a home or personal computer as opposed to an entity computer. A software product enables an individual to use the personal system as a stand-alone system without using a website.

Advantageously, the GUIs utilized throughout the process of inputting, revising and displaying personal information do not include identity theft indicators. This feature adds another level of security to the systems and methods of the present invention. In other embodiments, the user can provide personal information to a personal estate manager via snail mail, electronic mail, phone call, or facsimile. The user can use these methods of communication for providing, updating, revising and reviewing other information, for example, personal information.

Figure 4:
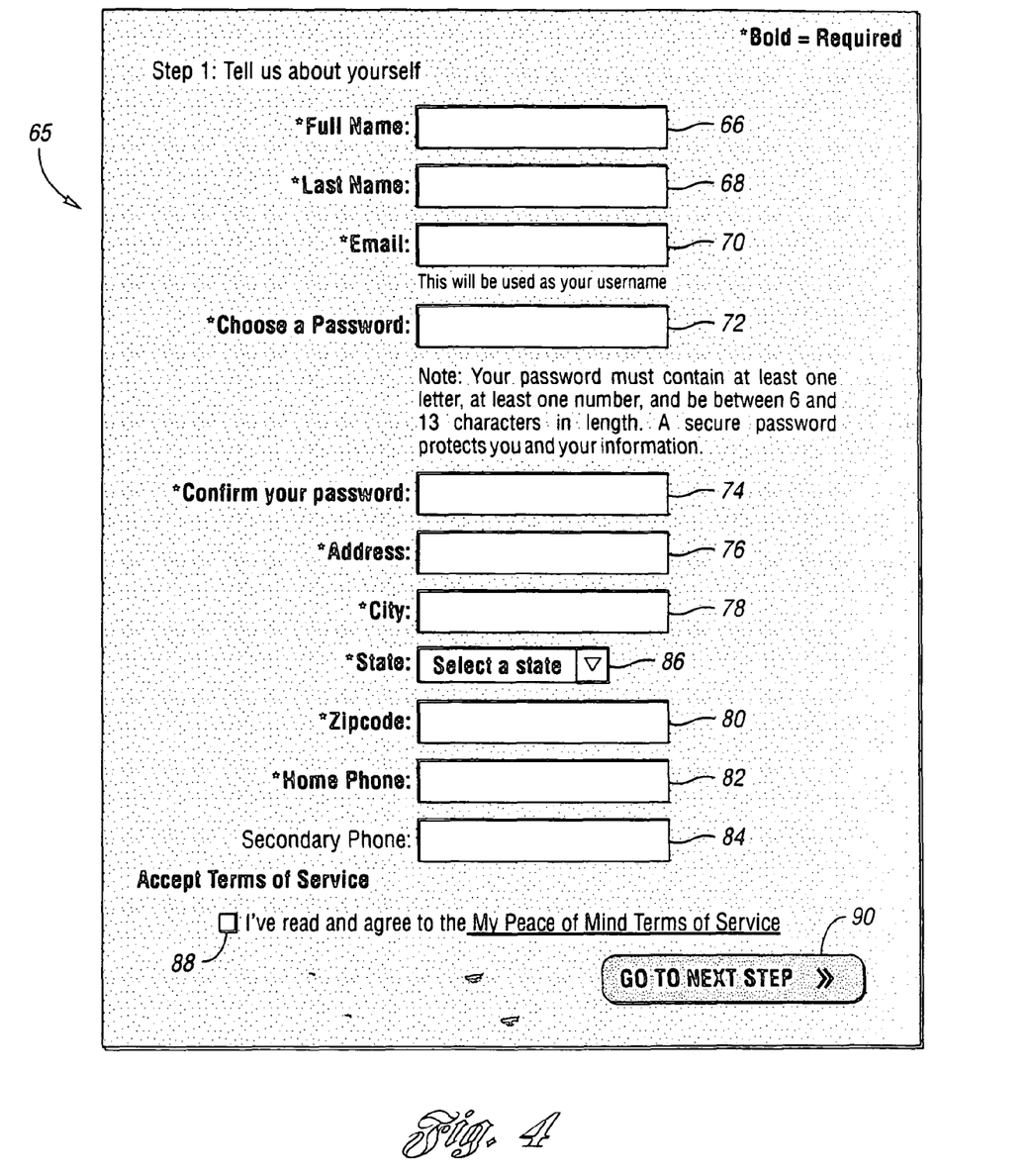
FIG. 4 is a graphical user interface (GUI) for inputting personal information of a prospective user according to one embodiment of the present invention.

FIG. 4 is GUI 65 for inputting personal information according to one embodiment of the present invention. GUI 64 includes data entry fields 66, 68, 70, 72, 74, 76, 78, 80, 82 and 84 for inputting first name, last name, email, password, confirmed password, address, city, zip code, home phone, and secondary phone. According to certain embodiments of the present invention, the user's e-mail address is used by the personal estate manager system as a user name. In certain embodiments, the user password must contain at least one letter, at least one number, and be between 6 and 13 characters in length. GUI 65 also includes drop down box 86 for selecting a user's state of residence. Check box 88 can be selected by the user to confirm that the user has read and agreed to the terms of service. Button 90 can be selected by the user to go to the next step in the process.

According to FIG. 2, the next step in the process is inputting access people, as depicted by block 92. Access people are individuals that the user gives different levels of access to their personal information. Non-limiting examples of access people are relatives, beneficiaries, heirs, designees, executor of the estate, a holder of power of attorney, financial advisor, trusted advisor, estate attorney and CPA. The user can utilize client computer 12, entity computer 14 and/or affiliate computer 16, which can display a GUI, for inputting access people information.

Figure 5:
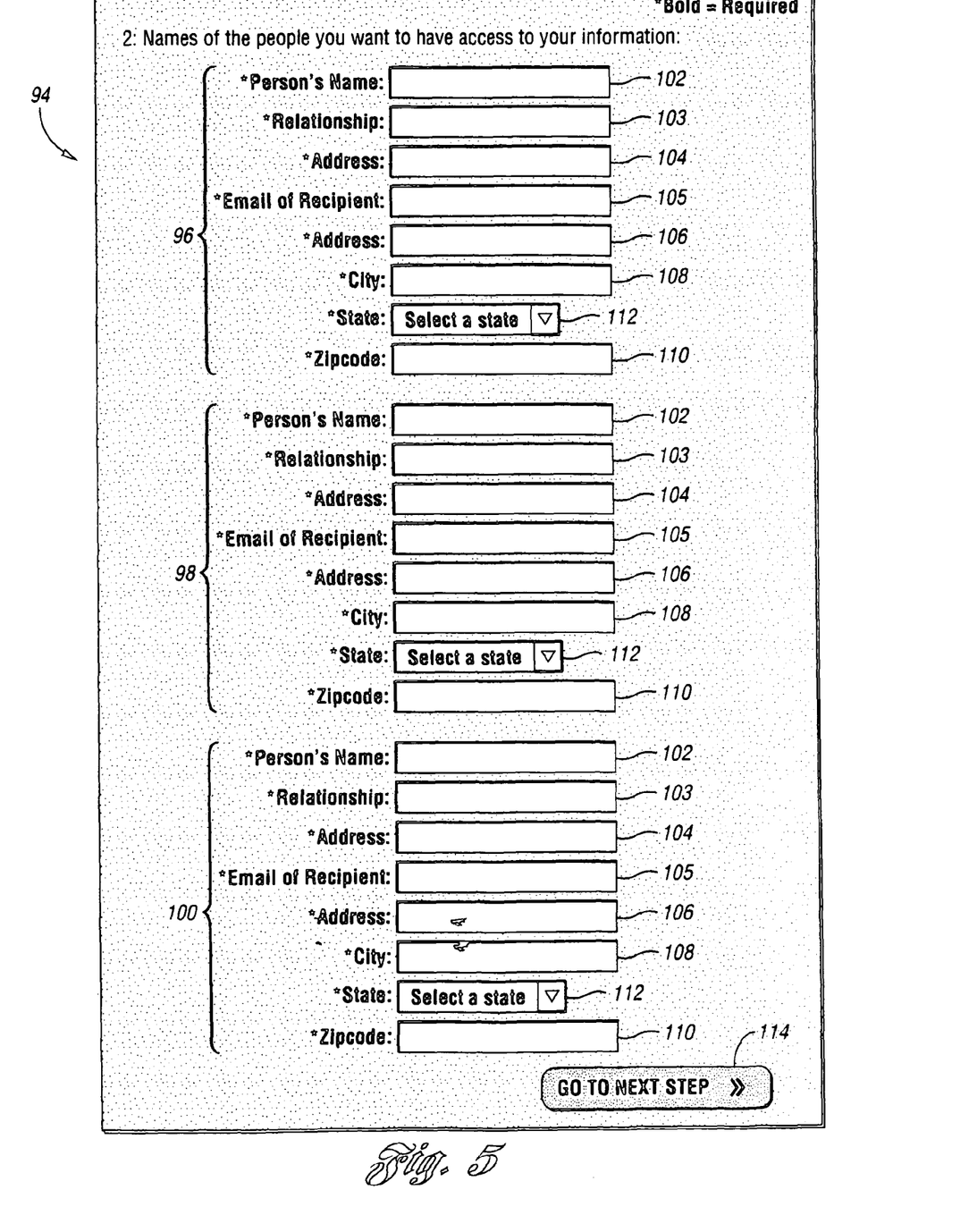
FIG. 5 is a GUI for inputting access people information according to one embodiment of the present invention.

For example, FIG. 5 is GUI 94 for inputting access information according to one embodiment of the present invention. GUI 94 includes input sections 96, 98 and 100 for inputting information for a first, second and third access person. It should be understood that more or less than three access people can be utilized according to the present invention. In certain embodiments, the user has the option of inputting between 1 and 12 access people. Each input section includes data entry fields 102, 103, 104, 105, 106, 108, and 110 for inputting person's name, relationship with user, phone number, e-mail address, city and zip code and drop down box 112 for selecting a state of residence for the access person. Once the user completes entry of the access person information, the user can select button 114 to go to the next step in the process.

According to FIG. 2, the next step in the process is approving or rejecting the enrollment based on the inputted personal information, as depicted in decision block 116. This step can be executed by personal estate module 19 residing on server computer 18. If the enrollment is rejected, the user is prompted again to input their personal information, as described above. A non-limiting example of a basis for rejecting enrollment is the use of a password that does not conform to the character and size limitations described above. If the enrollment is approved, the user is then prompted to input personal estate information, as shown in block 118.

Figure 6:
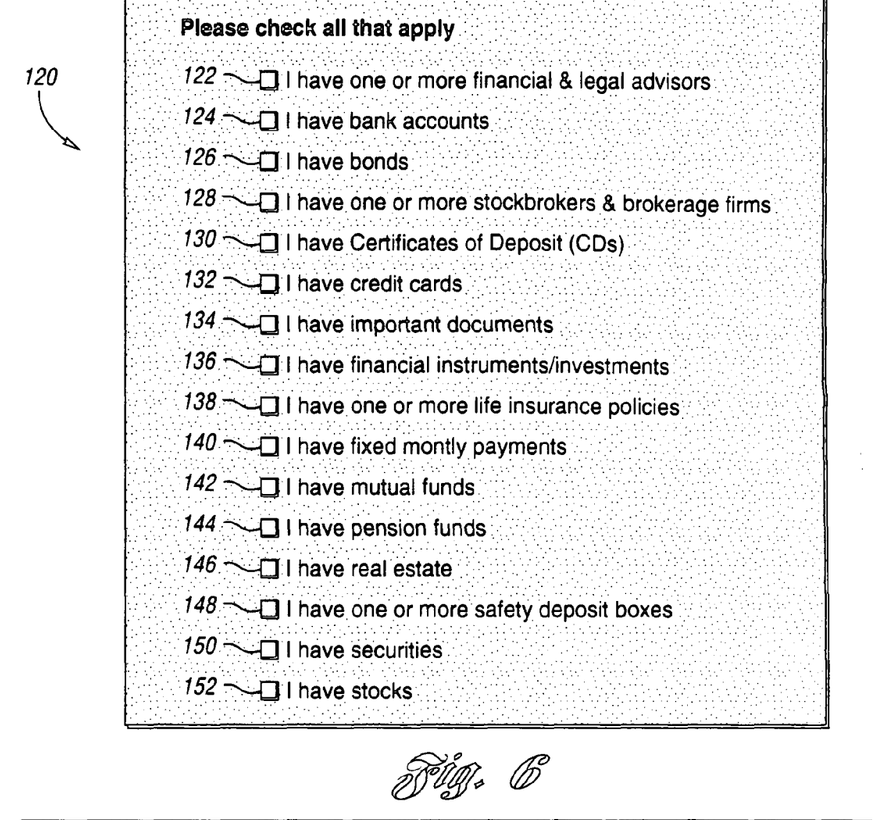
FIG. 6 is a GUI for selecting categories of personal information according to one embodiment of the present invention.

FIG. 6 shows GUI 120 for selecting categories of personal estate information. Click box 122 can be selected if the user has one or more financial and/or legal advisors. Click box 124 can be selected if the user has bank accounts. Click box 126 can be selected if the user has bonds. Click box 128 can be selected if the user has one or more stockbrokers and/or brokerage firms. Click box 130 can be selected if the user has certificates of deposit. Click box 132 can be selected if the user has credit cards. Click box 134 can be selected if the user has important documents. Click box 136 can be selected if the user has financial instruments and/or investments. Click box 138 can be selected if the user has one or more life insurance policies. Click box 140 can be selected if the user has fixed monthly payments. Click box 142 can be selected if the user has mutual funds. Click box 144 can be selected if the user has pension funds. Click box 146 can be selected if the user has real estate. Click box 148 can be selected if the user has one or more safety deposit boxes. Click box 150 can be selected if the user has securities. Click box 152 can be selected if the user has stocks.

Figure 7:
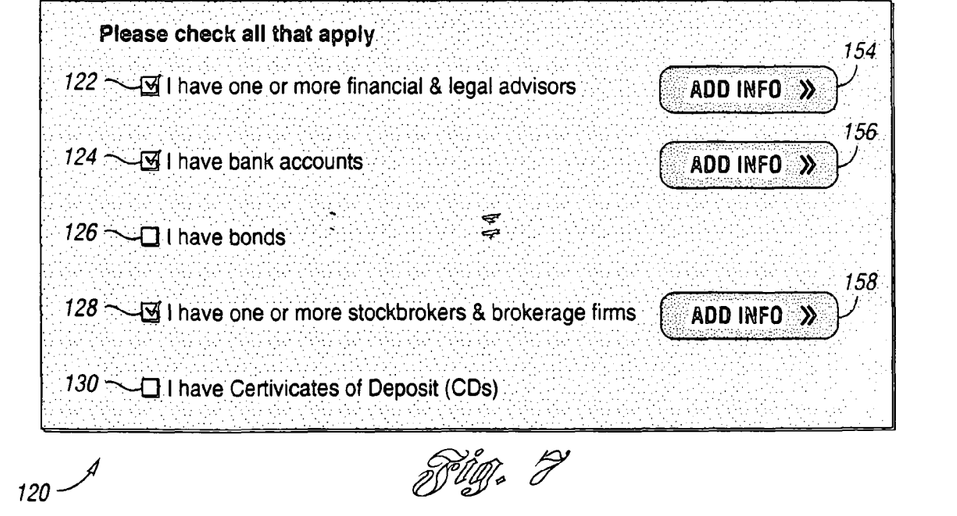
FIG. 7 is a GUI for triggering GUIs for inputting personal information by category according to one embodiment of the present invention.

Once the user selects one of the click boxes, an "ADD INFO" button appears. For example, FIG. 7 shows a fragment of GUI 120 for selecting categories of personal estate information and selecting the "ADD INFO" button for the identified categories. According to FIG. 7, the user has selected the check boxes 122, 124 and 128. Consequently, "ADD INFO" buttons 154, 156 and 158 appear.

Figure 8:
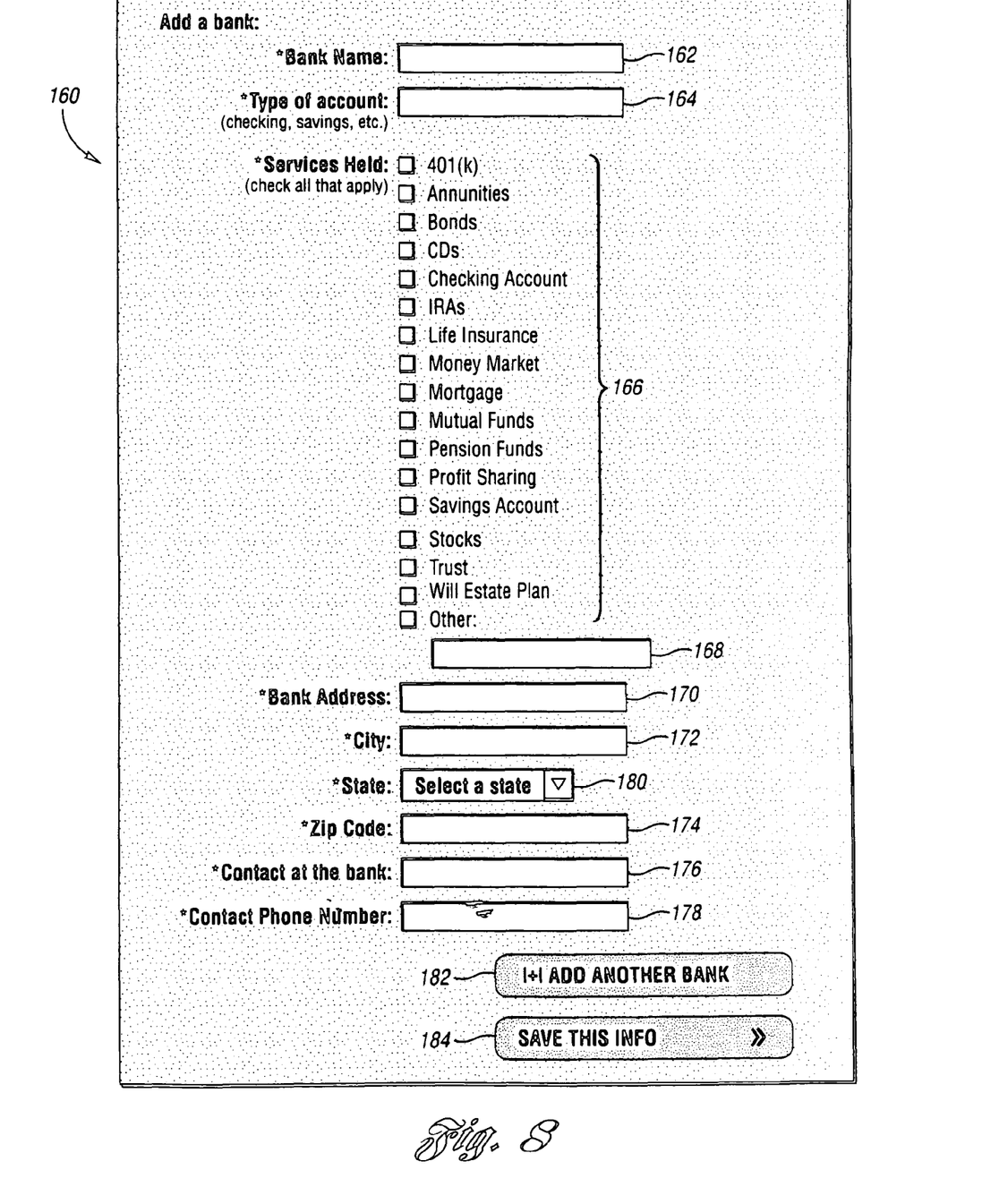
FIG. 8 is a GUI for inputting information relating to a user's bank according to one embodiment of the present invention.

Upon selecting one of the "ADD INFO" buttons, a GUI can be displayed for inputting information about the identified category. For example, FIG. 8 depicts GUI 160 for inputting information concerning a bank. GUI 160 includes data entry fields 162 and 164 for inputting bank name and type of account (e.g. checking, savings, etc.) Fragment 166 of GUI 160 includes a number of check boxes for identifying the services held by the user. According to FIG. 8, non-limiting examples of services held include 401(k), annuities, bonds, CDs, checking accounts, IRAs, life insurance policies, money market accounts, mortgages, mutual funds, pension funds, profit sharing accounts, savings accounts, stocks, trusts, wills estate plans, and other. Upon selecting other, the user can input the other service in data input field 168. In certain embodiments, upon selecting a services held, the user can be prompted to input information concerning the services held through a GUI.

GUI 160 also includes data input fields 170, 172, 174, 176 and 178 for inputting branch address, city, zip code, contact at the bank and contact phone number. GUI 160 also includes drop down box 180 for selecting the state where the bank is located. GUI 160 also includes button 182 for displaying a GUI for adding information about another bank and button 184 for saving the information about the current bank.

Figure 9:
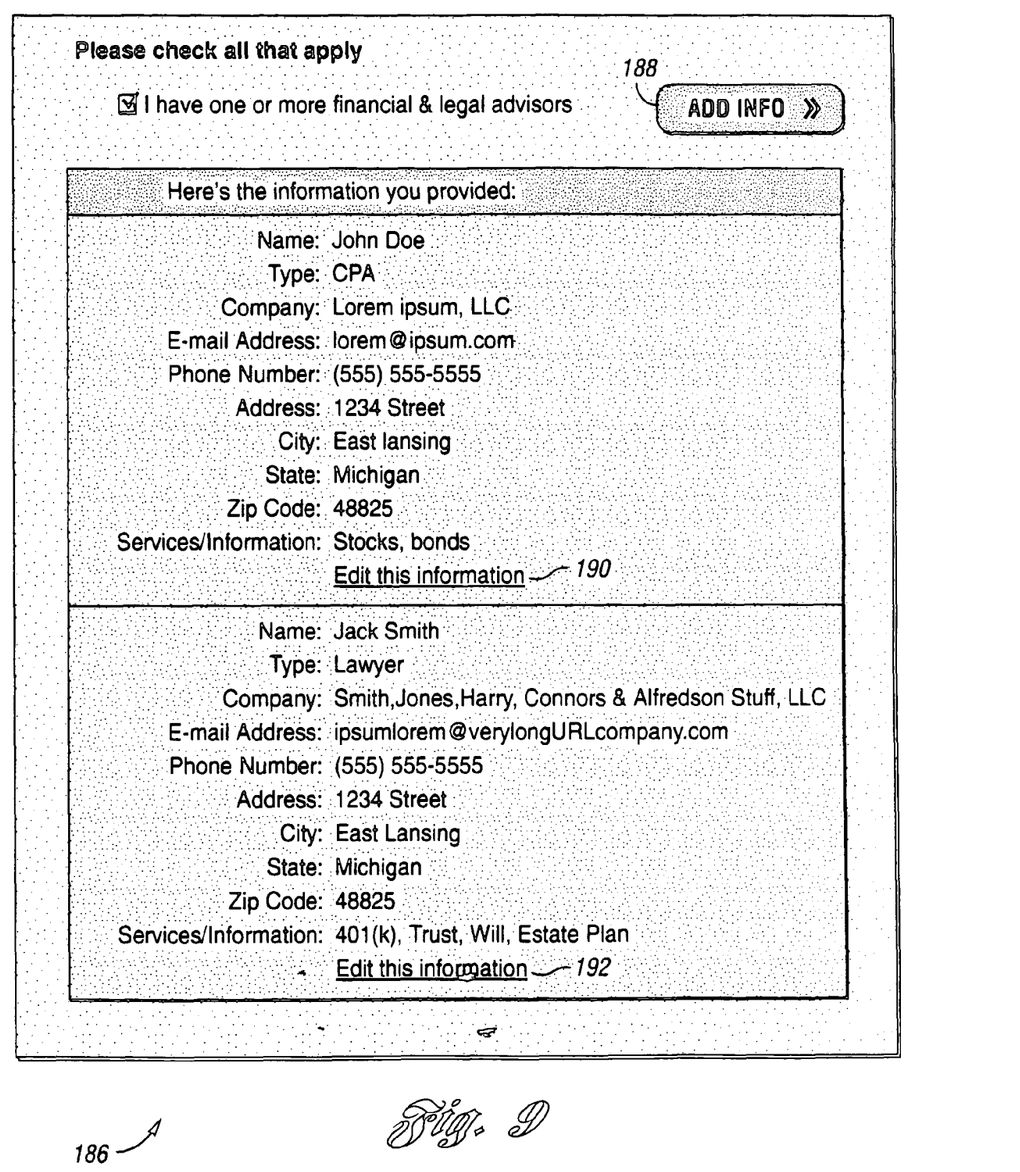
FIG. 9 is a GUI for displaying personal information of a user according to one embodiment of the present invention.

Once the user has input information for one of the identified categories and clicked on the save info button, this information is transmitted to server computer 18 and stored in data storage device 40. Moreover, this information can be displayed when the user returns to the category selection GUI. For instance, FIG. 9 depicts GUI 186 for displaying input personal estate information for financial and legal advisors. The user has the opportunity to add info concerning other financial and legal advisors by selecting button 188. The user can also edit the stored input information by selecting hypertext 190 or 192.

At any point after inputting and saving personal estate information to the personal estate manager system, the user can review the information, as indicated by block 192 of FIG. 2. In certain embodiments, a GUI can be displayed which includes all the personal estate information input and saved by the user.

Figure 3:
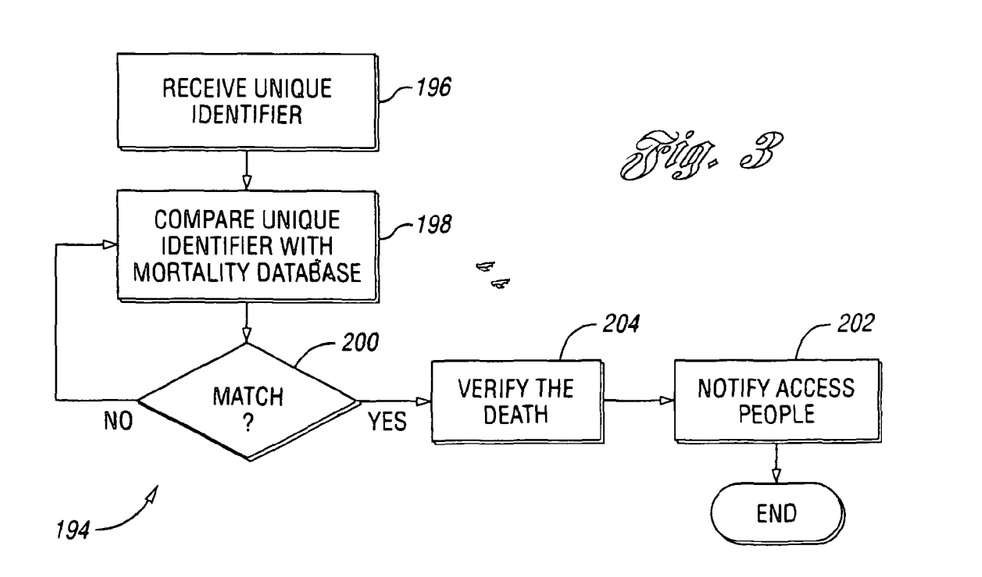
FIG. 3 is a flowchart of a method for conducting mortality tracking according to one embodiment of the present invention.

Referring to FIG. 3, a process for carrying out mortality tracking is shown. It should be understood that elements of this process can be modified, rearranged, and/or omitted according to different implementations of the present invention. In certain embodiments, once a user successfully enrolls in the personal estate management system and provides a unique identifier, a mortality tracking system automatically and continuously tracks the mortality status of the user. The mortality tracking system can be embodied in a computer module loaded on a computer, for example, tracking computer 60. It should be understood that the mortality tracking system can also be implemented by a personal estate manager who compares paper records to obtain a mortality match.

Flowchart 194 begins with the receipt of a unique identifier, as depicted in block 196. The unique identifier can be received via phone call, facsimile, electronic mail, and/or snail mail. Moreover, the unique identifier can be received through a GUI. Further, the unique identifier can be transmitted directly to a secure server computer, without being transmitted through dedicated computer 32. The unique identifier can also be obtained by checking a database, for example, a credit bureau report, that cross-indexes social security numbers with an individual's home, address, etc. As another non-limiting example, when paired with the code of an issuing state or code for the issuing state, a driver's license number can be a unique identifier. The unique identifier can be written into a paper record maintained by a personal estate manager. Alternatively, the unique identifier can be stored in an offline database, not accessible through the Internet. In certain embodiments, the unique identifier is a social security number. Other non-limiting examples of unique identifiers include dental records, retinal records, finger prints, deoxyribonucleic acid (DNA) or other unique trait, trace, or characteristic of an individual. Another example of a unique identifier is a national identity number, such as a passport number. According to block 198, after receipt of the unique identifier, this value can be compared with mortality database 62 having a number of mortality records. A non-limiting example of a mortality database is the United States Social Security Administration mortality database. Each mortality record can include a deceased individual's unique identifier and possibly other information concerning the individual.

If the received unique identifier matches a deceased individual's unique identifier, then the mortality tracking system verifies the death, as depicted in decision block 200 and block 204. The death can be verified by checking the U.S. Social Security Administration death records. Verification can also be obtained through county morgue records, funeral home records, hospital records, and/or obituaries. Verifying death can also include checking state and county records of death certificates. Once a match is obtained and verified, a report can be generated to alert the personal estate manager of the match. Once the death is verified, the mortality tracking system notifies the access people of the death, as depicted in block 202. In certain embodiments, the system transmits an e-mail to server computer 18, which triggers the notification process.

If there is no match, then the mortality tracking system carries out the comparing step continuously until a match is obtained, as depicted in decision block 200 and block 198. In certain embodiments, the mortality tracking module of tracking computer 60 continuously compares the user's unique identifier with current data in the mortality database. In other embodiments, the comparing step is executed intermittently, for example once an hour, day, or week.

In certain embodiments, the mortality tracking system also includes functionality to transmit e-mail reminders to monitored individuals and to utilize a failure to respond as a trigger for contacting the access individual to notify them to contact the monitored individual and confirm that the monitored individual is alive. This functionality allows the mortality tracking system to send out a periodic e-mail reminder to the monitored individual. If the monitored individual does not respond to the e-mail reminder within a certain period of time, mortality searching for this specific individual can be initiated.

Moreover, the mortality tracking system can include a triggering feature in which mortality searching occurs after receipt of a mortality indicator, for example, return mail, an unpaid invoice, or inactivity of an investment account. In these cases, there is an indication that the non-responsiveness is due to death or disability. For example, an entity, e.g. a financial services company, sends an invoice or statement of account to a monitored individual, which is returned as undeliverable. The financial services company can use the undeliverable mail return as a trigger for contacting the access people and/or initiating a mortality search. Another example of a triggering event can be a missed meeting with a representative of the financial services company followed by the inability to contact the monitored individual. As another example, the financial services company can monitor its accounts for activity. According to embodiments of the present invention, mortality searching can be triggered if there is no activity for a certain number of days. The monitoring of the account activity can be accomplished through a search of, an entity's, e.g. a financial service company's, database conducted on a regular interval, for example, weekly or monthly. If there is no activity for the prescribed period, then the company can conduct a mortality search for the monitored individual.

The access people can also receive information about the deceased user's personal estate. The information received by the access person can be based on their status. For example, a beneficiary can receive information about the deceased user's assets. Depending on the personal estate information input and stored in the personal estate manager system, the beneficiary notification can include, but is not limited to, information concerning life insurance policies, safety deposit boxes, 401(k)'s, accounts established under section 125 of the U.S. Internal Revenue Code, I.R.A.s, saving accounts, checking accounts, credit unions, stocks, property real estate holdings, pension functions, credit cards, mortgage policies, group life insurance policies, accident and health payments and policies, S.S.A. benefits, V.A. death benefits, disability benefits, mineral royalties, unpaid wage and benefits, pension funds, profit sharing, severance pay, unused vacation pay, sick pay, employee savings, medical accounts, flexible spending accounts, refunds from property taxes, uncashed interest and dividends, shares resulting from stock splits, trust, estate, financial planners, misplaced certificates, matured bearer and registered bonds, unredeemed savings bonds, unredeemed government securities, U.S. savings bonds, government bonds, unexchanged shares from mergers, and/or called bonds.

As another non-limiting example of the use of personal information, the personal estate manager system can also notify the user of important dates, for example, maturity dates, of assets and other personal items. The reminder notification can be sent via electronic mail, post card, letter, phone, facsimile and/or newsletter. Non-limiting examples of assets and/or items subject to the reminder notification include savings bonds maturity, traveler's checks, gift certificates, annual billings, certificate of deposit maturity, small child accounts, college account personal and state funds, club and layaways, credit balances from loans, cashier checks, money orders, stock dividends, bond coupons, refunds, foreign exchange drafts, unrefunded deposits, utilities, landlord, rental companies, credit cards and debit cards, unused airline miles, passport renewals, concealed weapons permit, renewals, club membership, real estate license, prescription renewal, medical proxy, birthdays, anniversaries, graduations, and/or medical reminders.

According to certain embodiments of the present invention, a system is disclosed having the capability to allow users to store and manage information regarding warranties. Non-limiting examples of warranties include car, appliance, jewelry and electronics warranties.

According to certain embodiments of the present invention, a system is disclosed having the capability to allow users to store and retrieve wallet information, for example information relating to credit cards, debit cards, A.T.M.'s, membership cards and driver license numbers.

According to certain embodiments of the present invention, a system is disclosed having the capability to allow user to upload and store personal documents as another non-limiting form of personal information. Non-limiting examples of personal documents include real estate documents, insurance policies, tax returns, stock certificates, bond certificates, wills and estate plans.

Those of skill will further appreciate that the various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the present invention.

The various illustrative logical blocks, modules, as described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, micro controller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

The above description of the disclosed embodiments is provided to enable any person skilled in the art to make or use the invention. Various modifications to these embodiments will be readily apparent to those skilled in the art, and the generic principles defined herein can be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. A computer-implemented method for securely managing personal information and conducting mortality tracking, the method comprising:
   providing first and second tracking computers, the first tracking computer is in communication with a user computer and the second tracking computer is in communication with the user computer, the first tracking computer and second tracking computer are different than each other;
   electronically receiving on the first tracking computer personal information of a monitored individual from the monitored individual and an index for indexing a unique identifier of the monitored individual;
   on the first tracking computer, monitoring the use of the first tracking computer by the monitored individual to obtain an activity or inactivity status;
   automatically and electronically transmitting an inactivity notification to the monitored individual based on the occurrence of an inactivity status to obtain a response to the inactivity notification;
   receiving the index and the unique identifier on the second tracking computer;
   electronically storing the index and the unique identifier on the second tracking computer;
   on the second tracking computer, indexing the unique identifier based on the index;
   electronically receiving on the second tracking computer mortality information based on a mortality database having one or more records;
   on the second tracking computer, and based on a lack of response to the inactivity notification, electronically searching the mortality database records for the unique identifier of the monitored individual to obtain a mortality search result; and
   automatically and electronically transmitting a deceased status notification based on a positive result of the monitored individual being deceased for the mortality search result.

2. The computer-implemented method of claim 1 wherein the unique identifier is associated with a unique identifier in the mortality database.

3. The computer-implemented method of claim 1 wherein each mortality database record includes the unique identifier of an individual and a designator signifying whether the individual is deceased or living.

4. The computer-implemented method of claim 1 wherein the mortality search result is a positive result if the monitored individual is deceased and a negative result if the monitored individual is living.

5. The computer-implemented method of claim 4 further comprising automatically repeating the electronic searching step until a positive result is obtained.

6. The computer-implemented method of claim 1 wherein step includes transmitting the notification to at least one access individual.

7. The computer-implemented method of claim 6 further comprising electronically receiving contact information relating to the at least one access individual, wherein the monitored individual selects the at least one access individual.

8. The computer-implemented method of claim 7 wherein the monitored individual is a benefactor and the at least one access individual is a beneficiary.

9. The computer-implemented method of claim 1 wherein the mortality database is a governmental mortality database or a database derived from a governmental database.

10. The computer-implemented method of claim 1 wherein the index is an e-mail address of the monitored individual.

11. The computer-implemented method of claim 1 wherein the unique identifier is selected from the group consisting of: driver's license number coupled with an identifier for the issuing state, national identity number, social security number, dental identifier, fingerprint identifier, retinal identifier, and DNA profile.

12. The computer-implemented method of claim 1 wherein the deceased status notification includes the personal information of the monitored individual.

13. A computer-implemented method for securely managing personal information and conducting mortality tracking, the method comprising:
   electronically receiving personal information of a monitored individual and a unique identifier of the monitored individual;
   electronically receiving mortality information based on a mortality database having one or more records;
   periodically electronically searching the mortality database records for the unique identifier of the monitored individual to obtain a periodic mortality search result;
   upon occurrence of an aperiodic triggering event, a periodically electronically searching the mortality database records for the unique identifier of the monitored individual to obtain an aperiodic mortality search result; and
   automatically and electronically transmitting a deceased status notification based on a positive result of the monitored individual being deceased of either the periodic or aperiodic mortality search result.

14. The computer-implemented method of claim 13 wherein the aperiodic triggering event is inactivity of an account held by the monitored individual.

15. The computer-implemented method of claim 13 wherein the aperiodic triggering event is a lack of response from the monitored individual upon transmission of an e-mail to the monitored individual requesting response.

16. The computer-implemented method of claim 13 further comprising automatically and electronically transmitting a inactivity notification to the monitored individual based on the occurrence of the aperiodic triggering event, wherein the inactivity notification requests a response from the monitored individual.

17. The computer-implemented method of claim 16 further comprising initiating the aperiodic searching step upon a lack of response to the inactivity notification from the monitored individual.

18. The computer-implemented method of claim 16 further comprising preventing initiation of the aperiodic searching step upon receiving a response to the inactivity notification from the monitored individual.

19. The computer-implemented method of claim 1 wherein receiving the unique identifier on the second tracking computer is in response to a user input defining the unique identifier.

20. The computer-implemented method of claim 1 further comprising prompting the user to input a unique identifier to the second tracking computer.

* * * * *

UNITED STATES PATENT AND TRADEMARK OFFICE
CERTIFICATE OF CORRECTION

| | | |
|---|---|---|
| PATENT NO. | : 7,860,805 B2 | Page 1 of 1 |
| APPLICATION NO. | : 11/203695 | |
| DATED | : December 28, 2010 | |
| INVENTOR(S) | : Stephen E. Wood | |

It is certified that error appears in the above-identified patent and that said Letters Patent is hereby corrected as shown below:

Column 14, Line 57-58, Claim 6:

After "wherein" insert -- the --.

Column 15, Lines 27-28, Claim 13:

After "event," delete "a periodically" and insert -- aperiodically --.

Column 16, Line 11, Claim 16:

After "transmitting" delete "a" and insert -- an --.

Signed and Sealed this

Twenty-second Day of March, 2011

David J. Kappos
*Director of the United States Patent and Trademark Office*